(12) United States Patent
Batra et al.

(10) Patent No.: US 12,237,125 B2
(45) Date of Patent: Feb. 25, 2025

(54) METHOD FOR COORDINATING PROTECTIVE DEVICES IN A DISTRIBUTION GRID

(71) Applicant: Siemens Aktiengesellschaft, Munich (DE)

(72) Inventors: Shivansh Batra, Offenbach am Main (DE); Yi Zhu, Kuemmersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 13 days.

(21) Appl. No.: 17/599,119

(22) PCT Filed: Sep. 13, 2019

(86) PCT No.: PCT/EP2019/074541
§ 371 (c)(1),
(2) Date: Sep. 28, 2021

(87) PCT Pub. No.: WO2020/200493
PCT Pub. Date: Oct. 8, 2020

(65) Prior Publication Data
US 2022/0172914 A1      Jun. 2, 2022

(30) Foreign Application Priority Data

Mar. 29, 2019   (WO) ................ PCT/CN2019/080553
Mar. 29, 2019   (WO) ................ PCT/CN2019/080554
Mar. 29, 2019   (WO) ................ PCT/CN2019/080558

(51) Int. Cl.
*H01H 33/59*       (2006.01)
*H01H 9/54*        (2006.01)
(Continued)

(52) U.S. Cl.
CPC .......... *H01H 33/596* (2013.01); *H01H 9/542* (2013.01); *H02H 1/0007* (2013.01);
(Continued)

(58) Field of Classification Search
CPC ...... H01H 33/596; H01H 9/001; H01H 9/542; H02H 1/0007; H02H 3/087; H02H 7/1252;
(Continued)

(56) References Cited

U.S. PATENT DOCUMENTS 5,654,859 A    8/1997  Shi
8,803,358 B2   8/2014  Hafner et al.
(Continued)

FOREIGN PATENT DOCUMENTS

CA    2910979 A1    1/2015
CN    101741057 A   6/2010
(Continued)

OTHER PUBLICATIONS

PCT International Search Report and Written Opinion of International Searching Authority dated Dec. 10, 2019 in PCT International Application No. PCT/EP2019/074545 filed Sep. 13, 2019.
(Continued)

*Primary Examiner* — Yemane Mehari
(74) *Attorney, Agent, or Firm* — Harness, Dickey & Pierce, P.L.C.

(57) ABSTRACT

In a method for coordinating a distribution grid of different levels of electromechanical switches and automatically electrically closable apparatuses in a DC circuit, the distribution grid is arranged between feed-in devices and loads and includes at least one busbar. Each of the apparatuses includes an electrical switch to open or close the DC circuit, a fault current detection device, a tripping unit, and a pre-charging apparatus.

20 Claims, 10 Drawing Sheets

(51) Int. Cl.
  *H02H 1/00* (2006.01)
  *H02H 3/087* (2006.01)
  *H02H 7/125* (2006.01)
  *H02H 7/22* (2006.01)
  *H02H 7/26* (2006.01)
  *H02H 9/00* (2006.01)
  *H02J 1/10* (2006.01)
  *H02J 1/12* (2006.01)

(52) U.S. Cl.
  CPC .......... *H02H 3/087* (2013.01); *H02H 7/1252* (2013.01); *H02H 7/1257* (2013.01); *H02H 7/222* (2013.01); *H02H 7/268* (2013.01); *H02H 9/001* (2013.01); *H02J 1/10* (2013.01); *H02J 1/12* (2013.01); *H01H 2009/544* (2013.01)

(58) Field of Classification Search
  CPC ...... H02H 7/1257; H02H 7/268; H02H 9/001; H02J 1/10; H02J 1/12
  USPC .......................................................... 361/8
  See application file for complete search history.

(56) References Cited

U.S. PATENT DOCUMENTS

| | | | |
|---|---|---|---|
| 9,042,146 B2 | 5/2015 | Weiss et al. | |
| 9,184,003 B2 | 11/2015 | Crane | |
| 9,525,284 B2 | 12/2016 | Kim et al. | |
| 9,698,589 B1* | 7/2017 | Leyh | H02H 7/26 |
| 9,755,433 B2 | 9/2017 | Xu et al. | |
| 9,853,536 B2 | 12/2017 | Xu et al. | |
| 10,693,293 B2 | 6/2020 | Qi et al. | |
| 10,944,254 B2 | 3/2021 | Shi et al. | |
| 2004/0027734 A1 | 2/2004 | Fairfax et al. | |
| 2005/0052798 A1 | 3/2005 | Grisoni | |
| 2007/0014062 A1 | 1/2007 | Fischer | |
| 2007/0077830 A1 | 4/2007 | Rzadki et al. | |
| 2010/0118450 A1 | 5/2010 | Ritzinger et al. | |
| 2010/0231042 A1 | 9/2010 | Weale | |
| 2010/0292853 A1 | 11/2010 | McDonnell | |
| 2011/0127853 A1* | 6/2011 | Fujita | G01D 4/004 307/131 |
| 2011/0298283 A1 | 12/2011 | Sannino et al. | |
| 2012/0218676 A1 | 8/2012 | Demetriades et al. | |
| 2013/0021708 A1 | 1/2013 | Demetriades et al. | |
| 2013/0106184 A1 | 5/2013 | Hafner et al. | |
| 2013/0121051 A1 | 5/2013 | Weiss et al. | |
| 2013/0270902 A1 | 10/2013 | Andersen et al. | |
| 2013/0307444 A1 | 11/2013 | Settemsdal | |
| 2013/0314828 A1 | 11/2013 | Chen et al. | |
| 2014/0063669 A1 | 3/2014 | Lundqvist | |
| 2014/0078622 A1* | 3/2014 | Crane | H01H 33/596 361/8 |
| 2014/0254050 A1 | 9/2014 | Haines et al. | |
| 2014/0361621 A1 | 12/2014 | Lindtjorn | |
| 2015/0014277 A1 | 1/2015 | Theisen et al. | |
| 2015/0137595 A1 | 5/2015 | Xu et al. | |
| 2016/0152151 A1 | 6/2016 | Yang et al. | |
| 2016/0172838 A1 | 6/2016 | Luebke et al. | |
| 2016/0190791 A1 | 6/2016 | Sim | |
| 2016/0336734 A1 | 11/2016 | Lee et al. | |
| 2017/0054291 A1 | 2/2017 | Qi et al. | |
| 2017/0098931 A1 | 4/2017 | Gerdinand et al. | |
| 2017/0170663 A1 | 6/2017 | Christ et al. | |
| 2017/0373498 A1 | 12/2017 | Haugan et al. | |
| 2018/0034258 A1* | 2/2018 | Schweitzer, III | H02H 3/05 |
| 2018/0159315 A1 | 6/2018 | Aagesen et al. | |
| 2018/0240627 A1 | 8/2018 | Matsuo et al. | |
| 2018/0241200 A1 | 8/2018 | Hu et al. | |
| 2019/0020193 A1* | 1/2019 | Cao | H01H 33/596 |
| 2019/0190258 A1 | 6/2019 | Shi et al. | |
| 2019/0267842 A1 | 8/2019 | Richter | |
| 2019/0334340 A1 | 10/2019 | Niehoff | |
| 2019/0353689 A1 | 11/2019 | Hauer | |
| 2020/0119548 A1 | 4/2020 | Haugan | |
| 2021/0339692 A1 | 11/2021 | Miro Bargallo et al. | |
| 2021/0359632 A1 | 11/2021 | Valasek et al. | |
| 2022/0020544 A1 | 1/2022 | Zhu | |
| 2022/0166214 A1 | 5/2022 | Batra et al. | |
| 2022/0172914 A1 | 6/2022 | Batra et al. | |

FOREIGN PATENT DOCUMENTS

| | | |
|---|---|---|
| CN | 202305715 U | 7/2012 |
| CN | 102696087 A | 9/2012 |
| CN | 102959818 A | 3/2013 |
| CN | 103457246 A | 12/2013 |
| CN | 203352192 U | 12/2013 |
| CN | 103762546 A | 4/2014 |
| CN | 104242229 A | 12/2014 |
| CN | 104518564 A | 4/2015 |
| CN | 104617573 A | 5/2015 |
| CN | 104638618 A | 5/2015 |
| CN | 105207178 A | 12/2015 |
| CN | 105162093 A | 12/2015 |
| CN | 105305372 A | 2/2016 |
| CN | 105322514 A | 2/2016 |
| CN | 105529677 A | 4/2016 |
| CN | 105743058 A | 7/2016 |
| CN | 105762775 A | 7/2016 |
| CN | 106099878 A | 11/2016 |
| CN | 106253243 A | 12/2016 |
| CN | 106486965 A | 3/2017 |
| CN | 106663557 A | 5/2017 |
| CN | 106786403 A | 5/2017 |
| CN | 206442309 U | 8/2017 |
| CN | 107210603 A | 9/2017 |
| CN | 107276045 A | 10/2017 |
| CN | 107565524 A | 1/2018 |
| CN | 107768195 A | 3/2018 |
| CN | 107810583 A | 3/2018 |
| CN | 108092253 A | 5/2018 |
| CN | 108152633 A | 6/2018 |
| CN | 108448548 A | 8/2018 |
| CN | 109193661 A | 1/2019 |
| CN | 109494693 A | 3/2019 |
| CN | 109494695 A | 3/2019 |
| EP | 2523331 A1 | 11/2012 |
| EP | 2634885 A1 | 9/2013 |
| EP | 3109964 A1 | 12/2016 |
| EP | 3379674 A1 | 9/2018 |
| EP | 3477809 A1 | 5/2019 |
| KR | 20160035845 A | 4/2016 |
| WO | WO-2005049418 A2 | 6/2005 |
| WO | WO 2012123015 A1 | 9/2012 |
| WO | WO-2013/131782 A1 | 9/2013 |
| WO | WO-2018/028247 A1 | 2/2018 |
| WO | WO-2018/109161 A1 | 6/2018 |

OTHER PUBLICATIONS

PCT International Search Report and Written Opinion of International Searching Authority dated Dec. 10, 2019 in PCT International Application No. PCT/EP2019/074539 filed Sep. 13, 2019.
ABB Substation Automation Products and Systems, "REF 541, 543, 545 Protection, Monitoring and Control Technical Reference Manual Part 1, General," 1 MRS750527-MUM, Sep. 29, 1997.
PCT International Search Report and Written Opinion of International Searching Authority dated Dec. 6, 2019 in PCT International Application No. PCT/EP2019/074542 filed Sep. 13, 2019.
PCT International Search Report and Written Opinion of International Searching Authority dated Dec. 9, 2019 in PCT International Application No. PCT/EP2019/074544 filed Sep. 13, 2019.
U.S. Appl. No. 17/599,055, filed Sep. 28, 2021.
U.S. Appl. No. 17/599,067, filed Sep. 28, 2021.
U.S. Appl. No. 17/599,103, filed Sep. 28, 2021.
U.S. Appl. No. 17/599,076, filed Sep. 28, 2021.
PCT International Search Report and Written Opinion of International Searching Authority dated Dec. 10, 2019 in PCT International Application No. PCT/EP2019/074541 filed Sep. 13, 2019.

(56) References Cited

OTHER PUBLICATIONS

Lin Wenfu:; "Electrical Operation of Power Units"; pp. 356-358; China Water & Power Press, Mar. 2007.

* cited by examiner

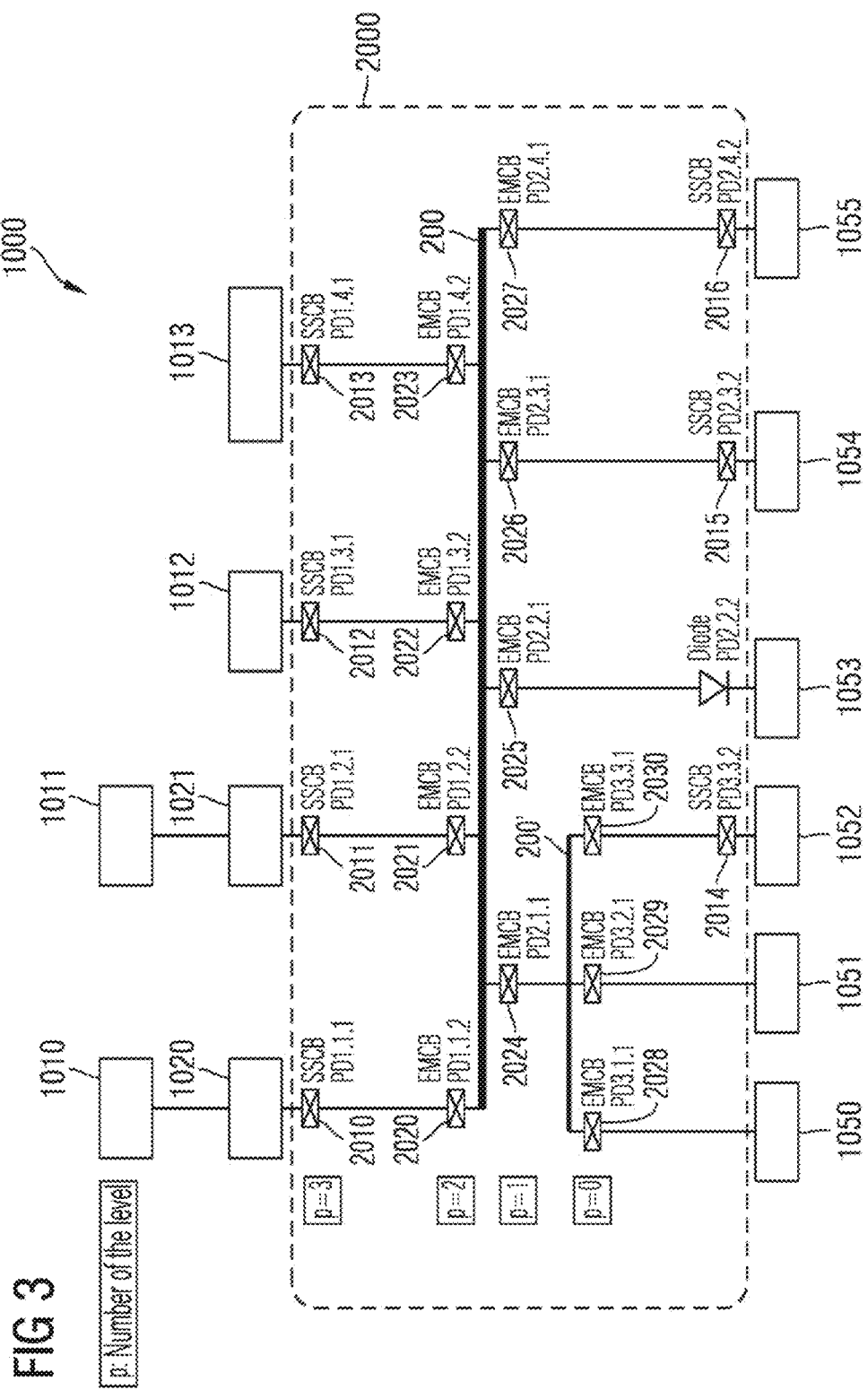

METHOD FOR COORDINATING PROTECTIVE DEVICES IN A DISTRIBUTION GRID

CROSS-REFERENCE TO RELATED APPLICATIONS

This application is the National Phase under 35 U.S.C. § 371 of PCT International Application No. PCT/EP2019/074541, which has an international filing date of Sep. 13, 2019, and which claims priority to PCT International Application No. PCT/CN2019/080553 filed Mar. 29, 2019, PCT International Application No. PCT/CN2019/080554 filed Mar. 29, 2019, and PCT International Application No. PCT/CN2019/080558 filed Mar. 29, 2019, the entire contents of each of which are incorporated herein by reference.

FIELD

Example embodiments of the present application generally relate to a method for coordinating protective devices in a distribution network.

BACKGROUND

DC distribution systems are considered to be promising with regard to the saving of energy and their efficient use. Particularly in the case of renewable energy sources or feeds, it may be easier to integrate them in a DC distribution system than in an AC system. For example, in the case of a photovoltaic system, the DC-AC/DC converter can be replaced with a simple DC/DC converter. Capacitor banks may likewise be directly connected to such a system as energy stores without additional converters.

If active front end (AFE) technology is used for feeding AC sources or if braking energy is recovered from motors, energy can be returned, whereas the AC side of the network is stabilized in the case of active front end (AFE) apparatuses and the network quality is therefore compensated overall with a reactive energy supply, the braking energy of motors can be supplied to the distribution system.

However, DC networks also have challenges with respect to the protection from short circuits or other fault sources. In an exemplary DC network corresponding to the illustration in FIG. 1 having feed-in devices 1010; 1011; 1012; 1013 and loads 1050; 1051; 1052; 1053; 1054 and an interposed distribution network 2000 having conventional mechanical protective apparatuses (for example molded case circuit breaker, MCCB), they lose their selectivity on account of the fast self-protection functions of the power electronics in the converters. In the illustration in FIG. 1, the feed-in devices 1010; 1011, for example, may be AC sources, which are fed into the system via active front ends (AFE) 1020; 1021.

Freewheeling diodes cannot be sufficiently protected by the self-protection of the converters and fuses on the AC side since there may be serious damage caused by electrical current on account of a possible voltage reversal in the event of LRC oscillations in the fault path. This is observed, in particular, if the active front end (AFE) is not connected to the busbar in a short-circuit-proof manner. The diodes may likewise act as uncontrolled rectifiers after the IGBTs have been switched off. In this case, the fault current is supplied from the AC side and may possibly not be switched off quickly enough by the fuses and may therefore destroy the diodes.

The discharging of a capacitor bank or DC links during a serious fault scenario generates extremely high current peaks, which flow within periods of time of ms (milliseconds). Conventional electromechanical switches are not fast enough to switch off such a fault current. The weakest feed-in or load path with the lowest nominal current has the highest ratio of maximum short-circuit current to the nominal current in such a system having a plurality of feed-in devices.

The main problems of a DC distribution system are the possible destruction of freewheeling diodes on account of a voltage reversal, the capacitive discharge and the selectivity with respect to the active front ends (AFE).

SUMMARY

In a protection concept which uses SSCBs (solid state circuit breaker, semiconductor switch) as protective devices, they can be used to disconnect fault regions within 10 μs (microseconds). The inventors have discovered that a problem with the pure use of semiconductor switches is that they have a considerably higher power loss and are additionally more cost-intensive than conventional switches. On account of the low currents of the self-protection functions of the semiconductor components of the (power) converters and their extremely fast response, it is very challenging to achieve selectivity with respect to the semiconductor switches.

Example embodiments of the invention provide a method for coordinating protective devices in a distribution network which improves upon or even overcomes at least one of the disadvantages mentioned.

At least one example embodiment, according to the invention, is directed to a method for coordinating a distribution network. Advantageous configurations are specified in the claims.

At least one example embodiment, according to the invention, is directed to a method for coordinating a distribution network of different levels of electromechanical switches and automatically electrically closable apparatuses in a DC circuit, wherein the distribution network is arranged between feed-in device(s) and loads and has at least one busbar, wherein the apparatuses each comprise an electrical switch for opening or closing the DC circuit,
a fault current detection device,
a tripping unit, and
a pre-charging apparatus, wherein, if a fault current is detected by the fault current detection device, the electrical switch opens the DC circuit via the tripping unit and the pre-charging apparatus restores the voltage on the busbar before the electrical switch is closed, and wherein the apparatus comprises a control unit for automatically closing the electrical switch after successful pre-charging. The method comprises:

in the case of an apparatus at a feed-in device, setting a counter a for the apparatus to the number of the level in the distribution network;
using the fault current detection device to detect whether there is a fault and, if there is no fault, jumping to detecting whether there is a fault; then
if there is a fault, determining whether the fault current ($I_{fault}$) exceeds a current threshold ($I_{inst}$); then
if the fault current ($I_{fault}$) exceeds the current threshold, opening the apparatuses; then
determining the direction of the fault current ($I_{fault}$); then
in the case of an apparatus at a load,
terminating the method in the case of a positive direction; or in the case of a negative direction, checking whether the network voltage on the busbar has been restored and, if this is the case, automatically closing the apparatus; and then jumping to detecting whether there is a fault; or in the case of an apparatus at a feed-in device, terminating the method in the case of a negative direction; or in the case of a positive direction, decrementing the counter a for the apparatus by one; and then if the counter a for the apparatus is less than or equal to zero, terminating the method; or if the counter a for the apparatus is greater than zero, waiting for the switch-off time ($t_{EMCB}$) of the electromechanical switches; and then using the pre-charging apparatus to carry out charging, in order to test whether the fault has been eliminated, within ms ($t_{charge}$, milliseconds); and then checking whether the charging is possible on the side of the loads using the pre-charging apparatus; and either:

if the charging is possible, recharging the distribution network within a few 10 ms ($t_{charge2}$, milliseconds), automatically switching on the apparatus, suppressing the switching transient ($t_{tran}$) and jumping to detecting whether there is a fault, or if the charging is not possible, jumping to decrementing the counter a for the apparatus by one.

An advantage here is that a reduced number of semiconductor switches can be used in the network, with the result that costs are minimized and power losses are likewise also minimized since they are used only for feed-in devices, energy stores and large motor loads with power feedback. In the event of a fault, the fault current can be very quickly interrupted via the circuit breakers within 10 μs (microseconds) and the fault can then be isolated at a relatively slow speed. This allows electromechanical electrical switches to be used in the rest of the system. The selectivity between the different protective devices can take place either in a time-controlled manner or via communication. Possible failures of the distribution network or of the entire electrical network can be kept as short as possible by using early assessment of the status of the electrical charge in the network.

In one configuration, the method in an electromechanical switch comprises the following further steps:

setting a counter b for the load to the number of the level in the distribution network; and then using the fault current detection device to detect whether there is a fault and, if there is no fault, jumping to setting the counter b; then determining the direction of the fault current ($I_{fault}$); then decrementing the counter b for the load by one in the case of a positive direction; then if the counter b for the load is less than or equal to zero, opening the electromechanical switch and terminating the method; or if the counter b for the load is not less than or equal to zero, waiting for the switch-off time ($t_{EMCB}$) of the electromechanical switches and the charging time ($t_{charge}$) of the pre-charging apparatus; and then checking whether the charging is possible on the side of the loads; and either:

if the charging is possible, waiting for the charging time ($t_{charge2}$) before automatically closing the apparatuses and jumping to setting the counter b for the load, or if the charging is not possible, jumping to decrementing the counter b for the load by one.

In a further configuration of the method, when checking whether the charging is possible on the side of the loads, a check is carried out in order to determine whether a predefined voltage threshold (Ures) has been reached.

In an alternative configuration of the method, when checking whether the charging is possible on the side of the loads, a check is carried out in order to determine whether a predefined threshold for the voltage change (du/dt) has been reached.

In a further configuration, the electrical switch in the at least one apparatus is a semiconductor switch.

In one configuration, the at least one apparatus also comprises a communication unit.

In a further configuration, the at least one apparatus also comprises a control unit for suppressing a switch-on transient. This control unit for a switch-on transient can suppress the high current in the switch-on transient in order to avoid incorrect fault detection.

In a further configuration, the pre-charging apparatus restores the voltage on the busbar after a first waiting time. Alternatively, the pre-charging apparatus restores the voltage on the busbar after receiving a command. The pre-charging apparatus can receive the command via the communication unit.

In a further configuration, the control unit for automatically closing the electrical switch automatically closes said switch after a second waiting time.

Alternatively, the control unit for automatically closing the electrical switch closes said switch after restoring a voltage on the busbar above a threshold value.

BRIEF DESCRIPTION OF THE DRAWINGS

The above-described properties, features and advantages of this invention and the manner in which they are achieved become clearer and more distinctly comprehensible in connection with the following description of the embodiments which are explained in more detail in connection with the figures, in which:

FIG. 3: shows a further electrical network having feed-in devices, loads and a distribution network with protective devices in levels;

DETAILED DESCRIPTION

Figure 1:
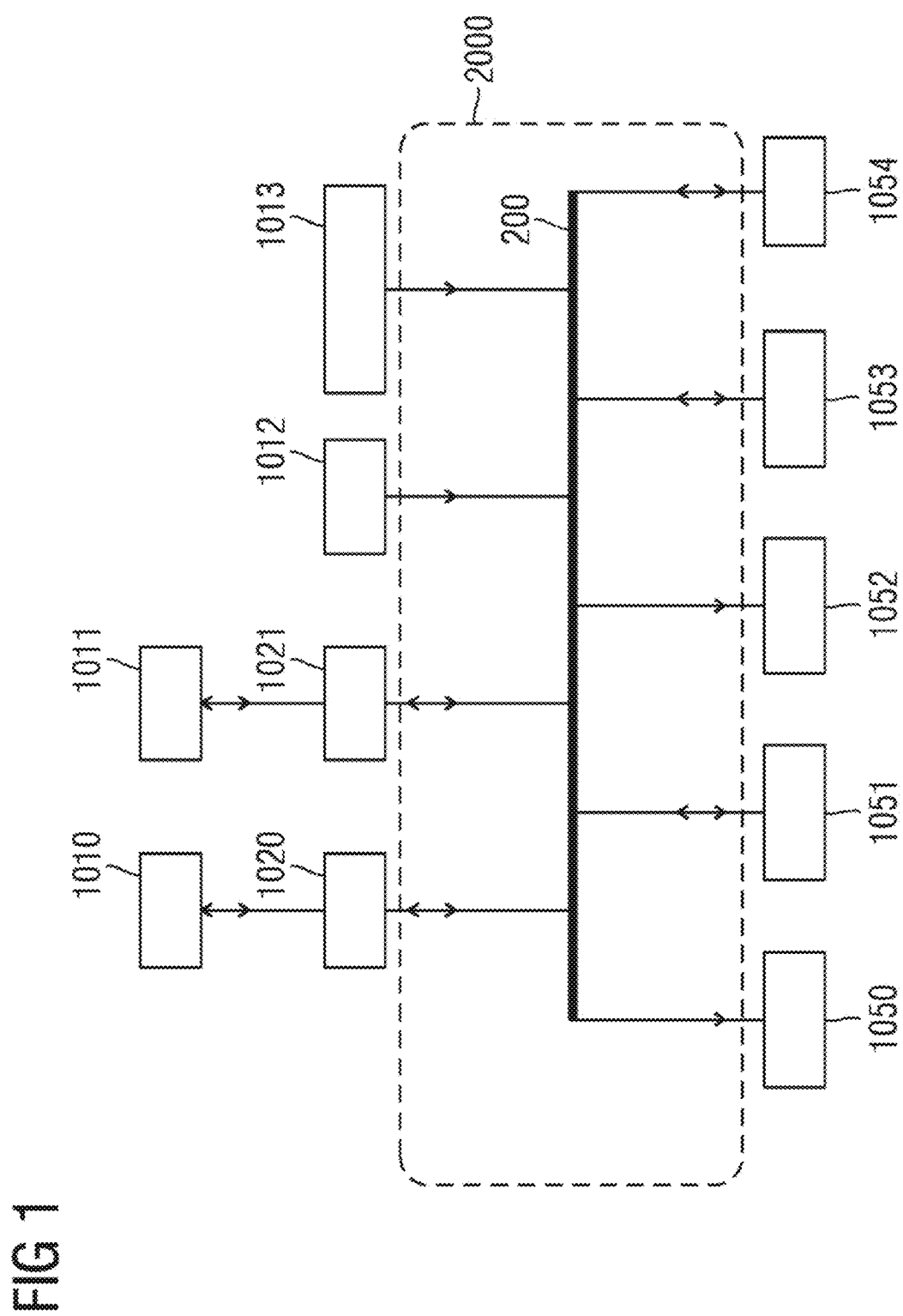
FIG. 1: shows an electrical network having feed-in devices, loads and a distribution network.

At least one example embodiment, according to the invention, is directed to a method for coordinating a distribution network of different levels of electromechanical switches and automatically electrically closable apparatuses in a DC circuit, wherein the distribution network is arranged between feed-in device(s) and loads and has at least one busbar, wherein the apparatuses each comprise an electrical switch for opening or closing the DC circuit,
a fault current detection device,
a tripping unit, and
a pre-charging apparatus, wherein, if a fault current ($I_{fault}$) is detected by the fault current detection device, the electrical switch opens the DC circuit via the tripping unit and the pre-charging apparatus restores the voltage on the busbar before the electrical switch is closed, and wherein the apparatus comprises a control unit for automatically closing the electrical switch after successful pre-charging. The method comprises:

in the case of an apparatus at a feed-in device, setting a counter a for the apparatus to the number of the level in the distribution network;
using the fault current detection device to detect whether there is a fault and, if there is no fault, jumping to detecting whether there is a fault; then
if there is a fault, determining whether the fault current ($I_{fault}$) exceeds a current threshold ($I_{inst}$); then if the fault current ($I_{fault}$) exceeds the current threshold, opening the apparatuses; then
determining the direction of the fault current ($I_{fault}$); then
in the case of an apparatus at a load,
terminating the method in the case of a positive direction; or
in the case of a negative direction, checking whether the network voltage on the busbar has been restored and, if this is the case, automatically closing the apparatus; and then
jumping to detecting whether there is a fault; or
in the case of an apparatus at a feed-in device,
terminating the method in the case of a negative direction; or
in the case of a positive direction, decrementing the counter a for the apparatus by one; and then
if the counter a for the apparatus is less than or equal to zero, terminating the method; or
if the counter a for the apparatus is greater than zero, waiting for the switch-off time ($t_{EMCB}$) of the electromechanical switches; and then
using the pre-charging apparatus to carry out charging, in order to test whether the fault has been eliminated, within ms ($t_{charge}$, milliseconds); and then
checking whether the charging is possible on the side of the loads using the pre-charging apparatus; and either:
if the charging is possible, recharging the distribution network within a few 10 ms ($t_{charge2}$, milliseconds), automatically switching on the apparatus, suppressing the switching transient ($t_{tran}$) and jumping to detecting whether there is a fault, or
if the charging is not possible, jumping to decrementing the counter a for the apparatus by one.

An advantage here is that a reduced number of semiconductor switches can be used in the network, with the result that costs are minimized and power losses are likewise also minimized since they are used only for feed-in devices, energy stores and large motor loads with power feedback. In the event of a fault, the fault current can be very quickly interrupted via the circuit breakers within 10 μs (microseconds) and the fault can then be isolated at a relatively slow speed. This allows electromechanical electrical switches to be used in the rest of the system. The selectivity between the different protective devices can take place either in a time-controlled manner or via communication. Possible failures of the distribution network or of the entire electrical network can be kept as short as possible by using early assessment of the status of the electrical charge in the network.

In one configuration, the method in an electromechanical switch comprises the following further steps:
setting a counter b for the load to the number of the level in the distribution network; and then
using the fault current detection device to detect whether there is a fault and, if there is no fault, jumping to setting the counter b; then
determining the direction of the fault current ($I_{fault}$); then
decrementing the counter b for the load by one in the case of a positive direction; then
if the counter b for the load is less than or equal to zero, opening the electromechanical switch and terminating the method; or
if the counter b for the load is not less than or equal to zero, waiting for the switch-off time ($t_{EMCB}$) of the electromechanical switches and the charging time ($t_{charge}$) of the pre-charging apparatus; and then
checking whether the charging is possible on the side of the loads; and either:
if the charging is possible, waiting for the charging time ($t_{charge2}$) before automatically closing the apparatuses and jumping to setting the counter b for the load, or
if the charging is not possible, jumping to decrementing the counter b for the load by one.

In a further configuration of the method, when checking whether the charging is possible on the side of the loads, a check is carried out in order to determine whether a predefined voltage threshold (Ures) has been reached.

In an alternative configuration of the method, when checking whether the charging is possible on the side of the loads, a check is carried out in order to determine whether a predefined threshold for the voltage change (du/dt) has been reached.

In a further configuration, the electrical switch in the at least one apparatus is a semiconductor switch.

In one configuration, the at least one apparatus also comprises a communication unit.

In a further configuration, the at least one apparatus also comprises a control unit for suppressing a switch-on transient. This control unit for a switch-on transient can suppress the high current in the switch-on transient in order to avoid incorrect fault detection.

In a further configuration, the pre-charging apparatus restores the voltage on the busbar after a first waiting time.

Alternatively, the pre-charging apparatus restores the voltage on the busbar after receiving a command. The pre-charging apparatus can receive the command via the communication unit.

In a further configuration, the control unit for automatically closing the electrical switch automatically closes said switch after a second waiting time.

Alternatively, the control unit for automatically closing the electrical switch closes said switch after restoring a voltage on the busbar above a threshold value.

FIG. 1 illustrates an exemplary DC network with the current flows under nominal conditions. Feed-in devices 1010; 1011; 1012; 1013 are connected to loads 1050; 1051; 1052; 1053; 1054 via a distribution network 2000 having a busbar 200. Feed-in devices 1010; 1011 may be, for example, AC sources which are connected to the distribution network 2000 via an active front end (AFE) 1020; 1021. In this case, the currents can flow into the distribution network 2000 or out of the latter in a bidirectional manner. Feed-in device 1012 may be, for example, a photovoltaic system, and feed-in device 1013 may be another type with power converters. Only a unidirectional flow of current in the direction of the distribution network 2000 is possible with these feed-in devices 1012; 1013.

A similar situation also applies to the loads; some loads enable a unidirectional flow of current and others enable a bidirectional flow of current to the network 2000. For example, load 1050 may be a resistive load, which allows only a unidirectional flow of current in its direction. The same applies to motors without power feedback, for example load 1052. The loads 1051; 1053; 1054 may be, for example, motors with power feedback, a capacitor bank as an energy store or a battery, wherein a bidirectional flow of current to and from the distribution network is possible with these loads.

The following definition shall apply to all figures for the direction of the flow of the fault current $I_{fault}$: according to the illustrations in the figures, a positive fault current $I_{fault}$ means that the current in the distribution network 2000 flows from the top to the bottom, and a negative fault current $I_{fault}$ means that the current in the distribution network 2000 flows from the bottom to the top.

Figure 2:
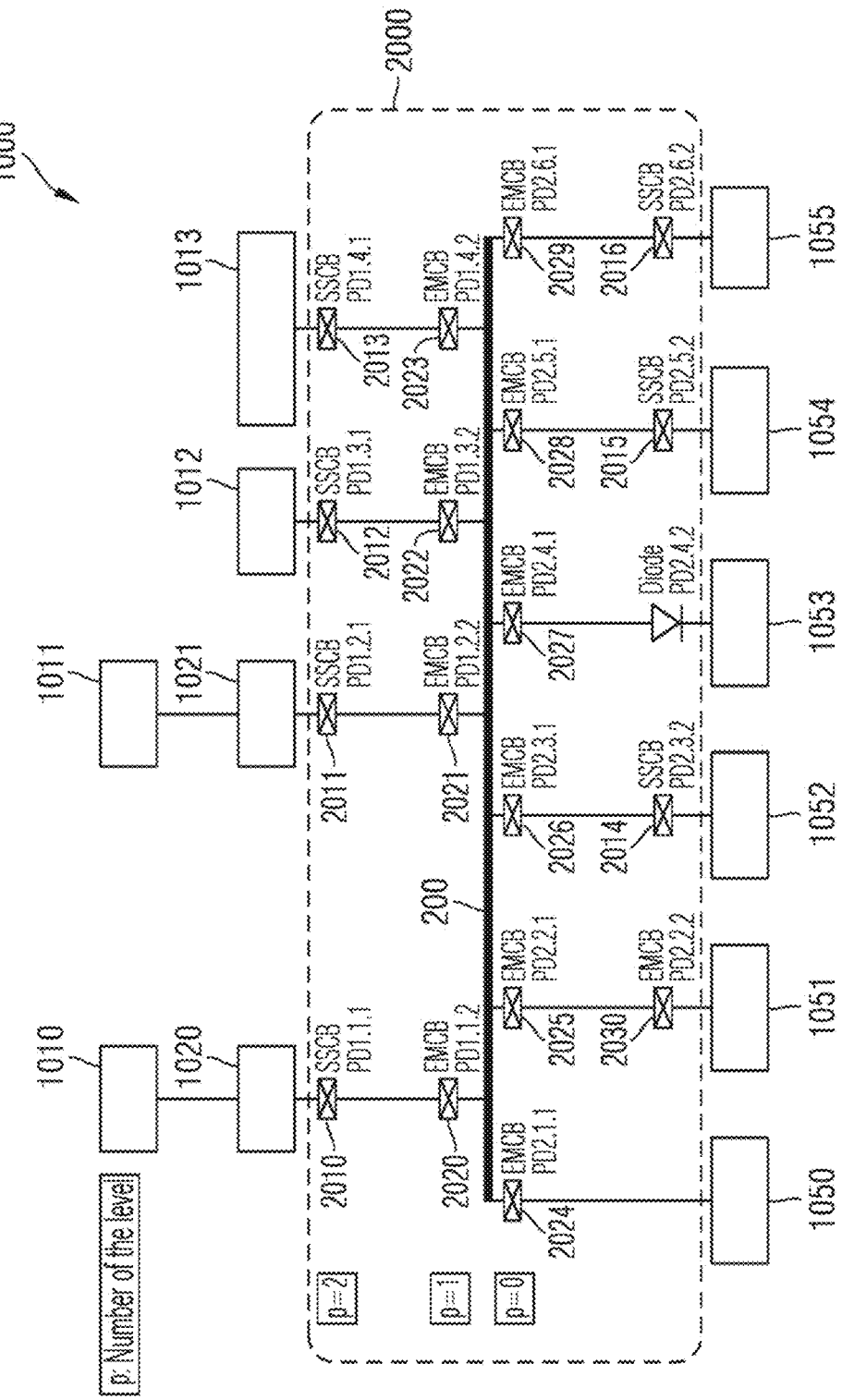
FIG. 2: shows an electrical network having feed-in devices, loads and a distribution network with protective devices in levels.

FIG. 2 shows the electrical network 1000 having feed-in devices 1010; 1011; 1012; 1013, loads 1050; 1051; 1052; 1053; 1054; 1055 and a distribution network 2000, which is arranged in between and has at least one busbar 200 as well as at least one apparatus 2010; 2011; 2012; 2013; 2014; 2015; 2016 for opening or closing a DC circuit.

The feed-in devices 1010; 1011; 1012; 1013 may each be individually electrically disconnected via one of the apparatuses 2010; 2011; 2012; 2013 for opening or closing a DC circuit. The apparatuses 2010; 2011; 2012; 2013 for opening or closing a DC circuit are each arranged between the feed-in devices and the busbar 200.

Furthermore, individual loads 1052; 1054; 1055 may also be individually electrically disconnected or disconnected from the busbar 200 via one of the apparatuses 2014; 2015; 2016 for opening or closing a DC circuit. The distribution network 2000 arranged in between also comprises conventional electromechanical switches 2020; 2021; 2022; 2023; 2024; 2025; 2026; 2027; 2028; 2029; 2030 for isolating faults.

The apparatuses for opening or closing a DC circuit may be arranged, for example, on high-capacity power converters, capacitor banks as energy stores, photovoltaic systems, batteries or loads with feedback, depending on the size of the DC link.

The different levels of electromechanical switches 2020; 2021; 2022; 2023; 2024; 2025; 2026; 2027; 2028; 2029; 2030 and automatically electrically closable apparatuses 2010; 2011; 2012; 2013; 2014; 2015; 2016 in a DC circuit, wherein the distribution network 2000 is arranged between the feed-in devices 1010; 1011; 1012; 1013 and the loads 1050; 1051; 1052; 1053; 1054, 1055, are numbered in the figure with p=0 (at the loads), p=1 and p=2 (at the feed-in device(s)).

FIG. 3 shows a further electrical network 1000 having feed-in devices 1010; 1011; 1012; 1013, loads 1050; 1051; 1052; 1053; 1054; 1055 and a distribution network 2000, which is arranged in between and has two busbars 200, 200' as well as apparatuses 2010; 2011; 2012; 2013; 2014; 2015; 2016 for opening or closing a DC circuit and conventional electromechanical switches 2020; 2021; 2022; 2023; 2024; 2025; 2026; 2027; 2028; 2029; 2030.

The distribution network 2000 differs from the electrical network 1000 from FIG. 2 as follows: a plurality of loads 1050; 1051; 1052 of the electrical network 2000 form a group. Each of these loads 1050; 1051; 1052 can be disconnected from the distribution network 2000 using an electromechanical switch 2028; 2029; 2030 in the event of a fault. The electromechanical switch 2028 is assigned to load 1050, the electromechanical switch 2029 is assigned to load 1051 and the electromechanical switch 2030 is assigned to load 1052. The electromechanical switches 2028; 2029; 2030 are electrically connected to a busbar 200', which is in turn electrically connected to the busbar 200 of the distribution network 2000 using an electromechanical switch 2024.

The arrangement of some apparatuses 1050; 1051; 1052 in a group produces, in at least this example embodiment, the different levels of electromechanical switches 2020; 2021; 2022; 2023; 2024; 2025; 2026; 2027; 2028; 2029; 2030 and automatically electrically closable apparatuses 2010; 2011; 2012; 2013; 2014; 2015; 2016 in a DC circuit, wherein the distribution network 2000 is arranged between the feed-in devices 1010; 1011; 1012; 1013 and the loads 1050; 1051; 1052; 1053; 1054; 1055, with p=0 (at the loads), p=1, p=2 and p=3 (at the feed-in device(s)).

Figure 4B:
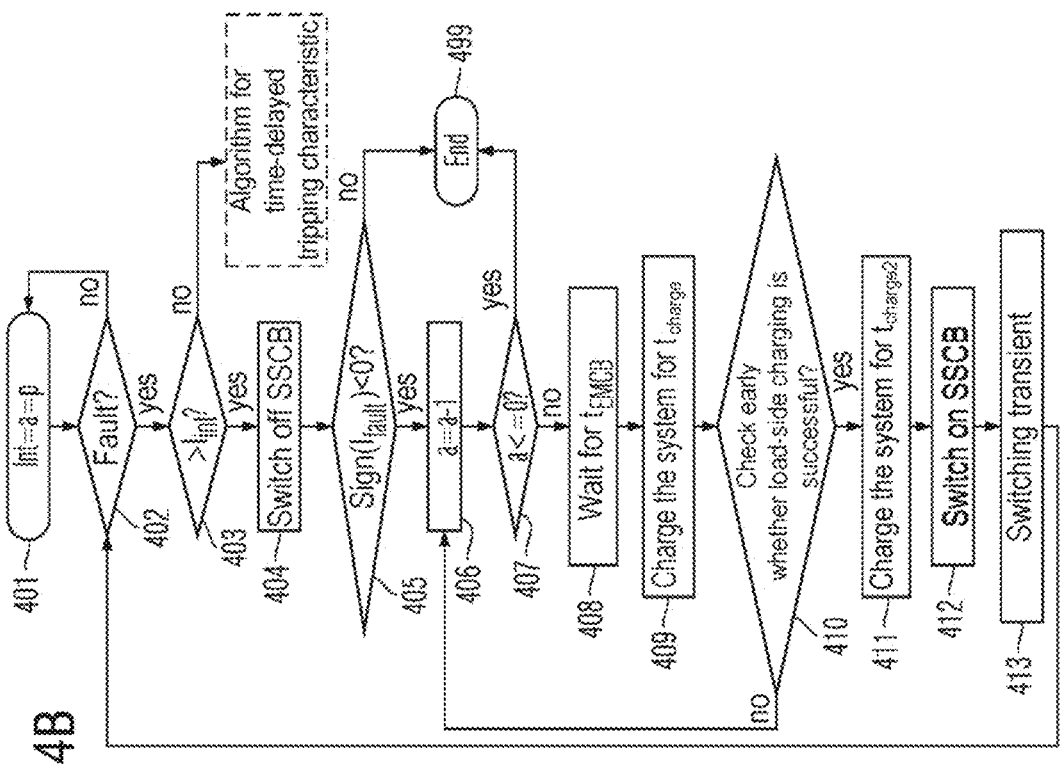
FIGS. 4A and 4B: show a method, according to at least one example embodiment of the invention, for coordinating the distribution network for the automatically electrically closable apparatuses of a DC circuit.
Figure 4A:
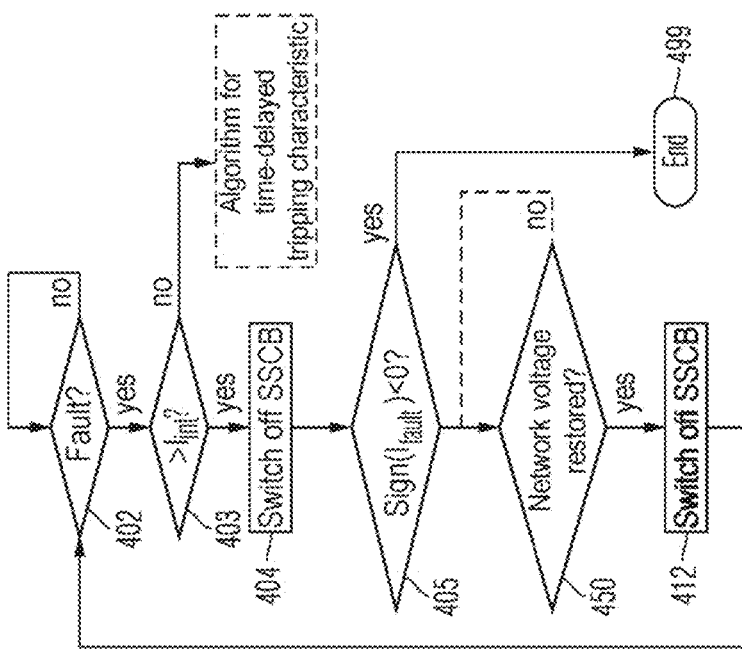

FIGS. 4A and 4B illustrate a method, according to at least one example embodiment of the invention, for coordinating a distribution network 2000 of different levels of electromechanical switches 2020; 2021; 2022; 2023; 2024; 2025; 2026; 2027; 2028; 2029; 2030 and automatically electrically closable apparatuses 2010; 2011; 2012; 2013; 2014; 2015; 2016 in a DC circuit. The distribution network 2000 is arranged between feed-in devices 1010; 1011; 1012; 1013 and loads 1050; 1051; 1052; 1053; 1054; 1055 and has at least one busbar 200; 200', wherein the apparatuses 2010; 2011; 2012; 2013; 2014; 2015; 2016 each comprise an electrical switch 110 for opening or closing the DC circuit,
a fault current detection device 120,
a tripping unit 130, and
a pre-charging apparatus 140, wherein, if a fault current ($I_{fault}$) is detected by the fault current detection device 120, the electrical switch 110 opens the DC circuit via the tripping unit 130 and the pre-charging apparatus 140 restores the voltage on the busbar 200 before the electrical switch 110 is closed, and wherein the apparatus 2010; 2011; 2012; 2013; 2014; 2015; 2016 comprises a control unit 150 for automatically closing the electrical switch 110 after successful pre-charging.

According to FIG. 4A (apparatus on the load side) and 4B (apparatus on the feed-in side), the method, according to at least one example embodiment of the invention, comprises the following steps:

in the case of an apparatus 2010; 2011; 2012; 2013; 2014; 2015; 2016 at a feed-in device 1010; 1011; 1012; 1013 (according to FIG. 4B): setting 401 a counter a for the apparatus 2010; 2011; 2012; 2013; 2014; 2015; 2016 to the number of the level p in the distribution network 2000;

using the fault current detection device 120 to detect 402 whether there is a fault and, if there is no fault, jumping to detecting 402 whether there is a fault; then if there is a fault, determining 403 whether the fault current $I_{fault}$ exceeds a current threshold $I_{inst}$; then if the fault current $I_{fault}$ exceeds the current threshold, opening 404 the apparatuses 2010; 2011; 2012; 2013; 2014; 2015; 2016; then determining 405 the direction of the fault current $I_{fault}$; then in the case of an apparatus 2010; 2011; 2012; 2013; 2014; 2015; 2016 at a load 1050; 1051; 1052; 1053; 1054; 1055 (according to FIG. 4A):

terminating 499 the method in the case of a positive direction; or in the case of a negative direction, checking 450 whether the network voltage on the busbar 200; 200' has been restored and, if this is the case, automatically closing 412 the apparatus 2010; 2011; 2012; 2013; 2014; 2015; 2016; and then jumping 402 to detecting whether there is a fault; or in the case of an apparatus 2010; 2011; 2012; 2013; 2014; 2015; 2016 at a feed-in device 1010; 1011; 1012; 1013 (according to FIG. 4B):

terminating 499 the method in the case of a negative direction; or in the case of a positive direction, decrementing 406 the counter a for the apparatus 2010; 2011; 2012; 2013; 2014; 2015; 2016 by one; and then if the counter a for the apparatus 2010; 2011; 2012; 2013; 2014; 2015; 2016 is less than or equal to zero 407, terminating 499 the method; or if the counter a for the apparatus 2010; 2011; 2012; 2013; 2014; 2015; 2016 is greater than zero 407, waiting 408 for the switch-off time $t_{EMCB}$ of the electromechanical switches 2020; 2021; 2022; 2023; 2024; 2025; 2026; 2027; 2028; 2029; 2030; and then using the pre-charging apparatus 140 to carry out charging 409 in order to test whether the fault has been eliminated within ms ($t_{charge}$, milliseconds); and then checking 410 whether the charging is possible on the side of the loads 1050; 1051; 1052; 1053; 1054; 1055 using the pre-charging apparatus 140; and either:

if the charging is possible, recharging 411 the distribution network 2000 within a few 10 ms ($t_{charge2}$, milliseconds), automatically switching on 412 the apparatus 2010; 2011; 2012; 2013; 2014; 2015; 2016, suppressing 413 the switching transient ($t_{tran}$) and jumping to detecting 402 whether there is a fault, or if the charging is not possible, jumping to decrementing 406 the counter a for the apparatus 2010; 2011; 2012; 2013; 2014; 2015; 2016 by one.

Figure 5A:
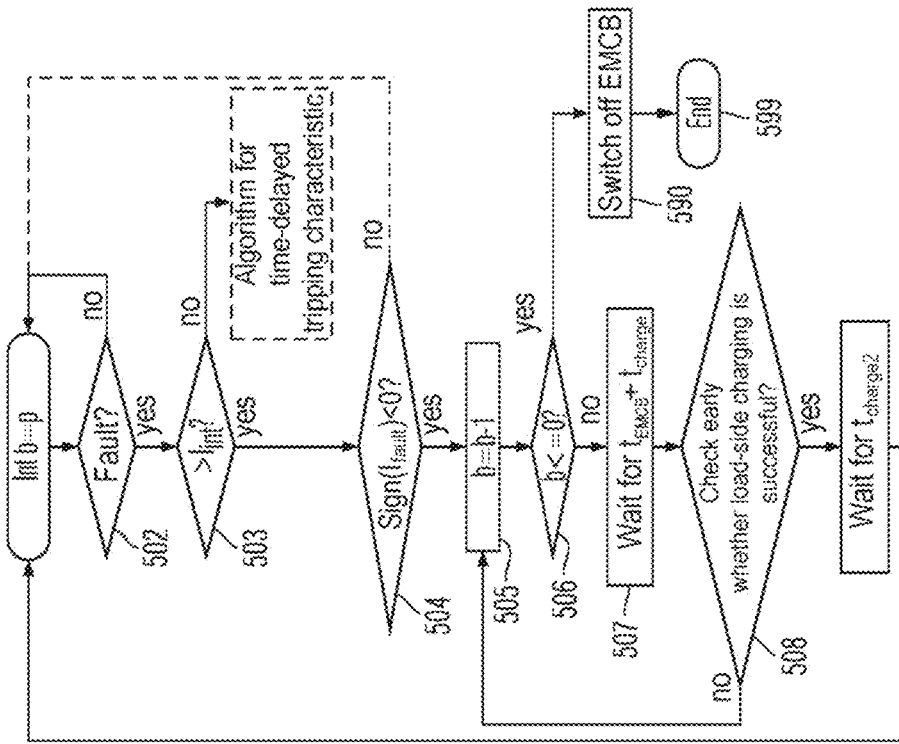
FIGS. 5A and 5B: show a method, according to at least one example embodiment of the invention, for coordinating the distribution network for the electromechanical switches.
Figure 5B:
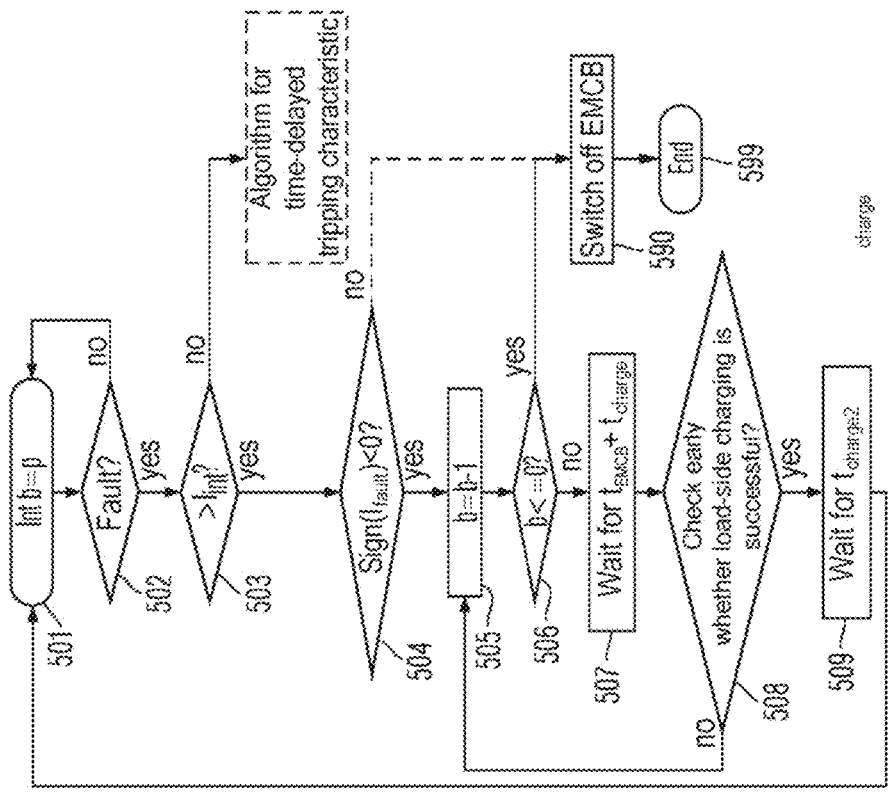

According to FIGS. 5A (on the feed-in side) and 5B (on the load side), the method, according to at least one example embodiment of the invention, in an electromechanical switch 2020; 2021; 2022; 2023; 2024; 2025; 2026; 2027; 2028; 2029; 2030 comprises the following further steps:

setting 501 a counter b for the load 1050; 1051; 1052; 1053; 1054; 1055 to the number of the level p in the distribution network 2000; and then using the fault current detection device 120 to detect 502 whether there is a fault and, if there is no fault, jumping to setting 501 the counter b; then determining 503 whether the fault current exceeds a current threshold $I_{inst}$ and, if this is the case:

determining 504 the direction of the fault current $I_{fault}$; then decrementing 505 the counter b for the load 1050; 1051; 1052; 1053; 1054; 1055 by one in the case of a positive direction; then if the counter b for the load 1050; 1051; 1052; 1053; 1054; 1055 is less than or equal to zero, opening 590 the electromechanical switch 2020; 2021; 2022; 2023; 2024; 2025; 2026; 2027; 2028; 2029; 2030 and terminating 599 the method; or if the counter b for the load 1050; 1051; 1052; 1053; 1054; 1055 is not less than or equal to zero, waiting 507 for the switch-off time $t_{EMCB}$ of the electromechanical switches 2020; 2021; 2022; 2023; 2024; 2025; 2026; 2027; 2028; 2029; 2030 and the charging time $t_{charge}$ of the pre-charging apparatus 140; and then checking 508 whether the charging is possible on the side of the loads 1050; 1051; 1052; 1053; 1054; 1055; and either:

if the charging is possible, waiting 509 for the charging time $t_{charge2}$ before automatically closing the apparatuses 2010; 2011; 2012; 2013; 2014; 2015; 2016 and jumping to setting 501 the counter b for the load 1050; 1051; 1052; 1053; 1054; 1055, or if the charging is not possible, jumping to decrementing 505 the counter b for the load 1050; 1051; 1052; 1053; 1054; 1055 by one.

FIGS. 6, 7, 8 and 9 each illustrate the electrical network 1000 according to FIG. 3 with the levels p=0 (at the loads), p=1, p=2 and p=3 (at the feed-in device(s)). A method, according to at least one example embodiment of the invention, is explained in more detail on the basis of possible fault scenarios for a fault 1500 in FIG. 6, for a fault 1501 in FIG. 7, for a fault 1502 in FIG. 8 and for a fault 1503 in FIG. 9.

Figure 6:
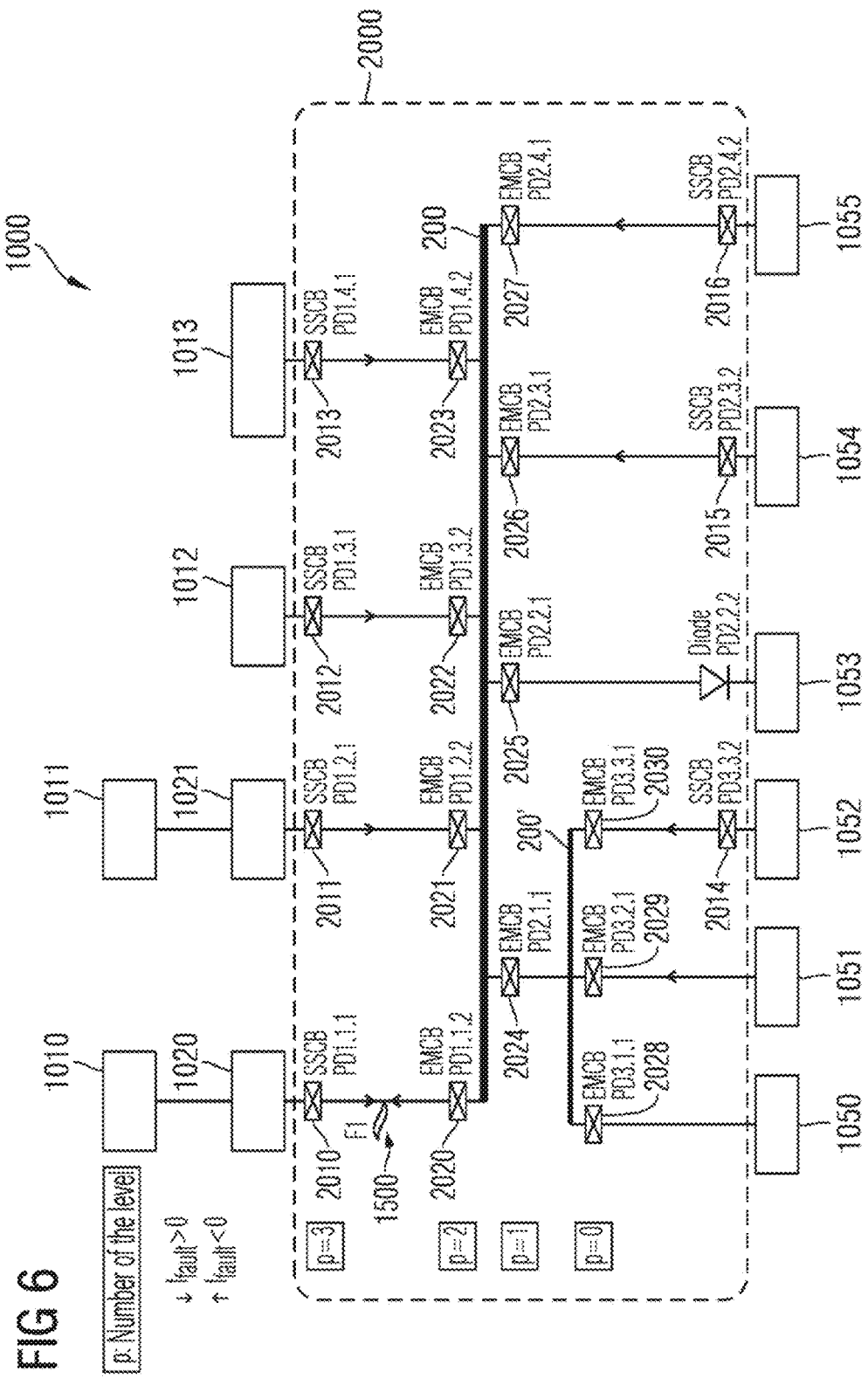
FIG. 6: shows a further electrical network having feed-in devices, loads and a distribution network with protective devices in different levels with a possible fault F1 in the feed-in level.

In FIG. 6, a possible fault 1500 has occurred between the automatically electrically closable apparatus 2010 in a DC circuit and the electromechanical switch 2020. The fault 1500 therefore occurs between the feed-in device 1010 and the busbar 200.

All automatically electrically closable apparatuses 2010; 2011; 2012; 2013; 2014; 2015; 2016 in a DC circuit at the feed-in devices 1010; 1011; 1012; 1013 and at the loads 2014; 2015; 2016 open instantaneously. The electromechanical switch 2020 experiences a negative fault current $I_{fault}$ and therefore likewise opens. The fault is therefore isolated within $t_{EMCB}$, the switching time of the electromechanical switches. The other electromechanical switches at the feed-in device(s) experience a positive fault current $I_{fault}$ and therefore do not open, just like the electromechanical switches at the loads which experience a negative fault current $I_{fault}$. The automatically electrically closable apparatus 2010 in a DC circuit attempts to restore the voltage on the load side, which, however, is not possible on account of the fault 1500, with the result that the automatically electrically closable apparatus 2010 in a DC circuit remains open. The other automatically electrically closable apparatuses 2011; 2012; 2013 in a DC circuit at the feed-in device(s) can restore the voltage since there is no fault here. Overall, the electrical network 1000 has been restored within the period of time $t_{EMCB}+t_{charge}+t_{charge2}+t_{tran}$ and is capable of operation again within this time.

Figure 7:
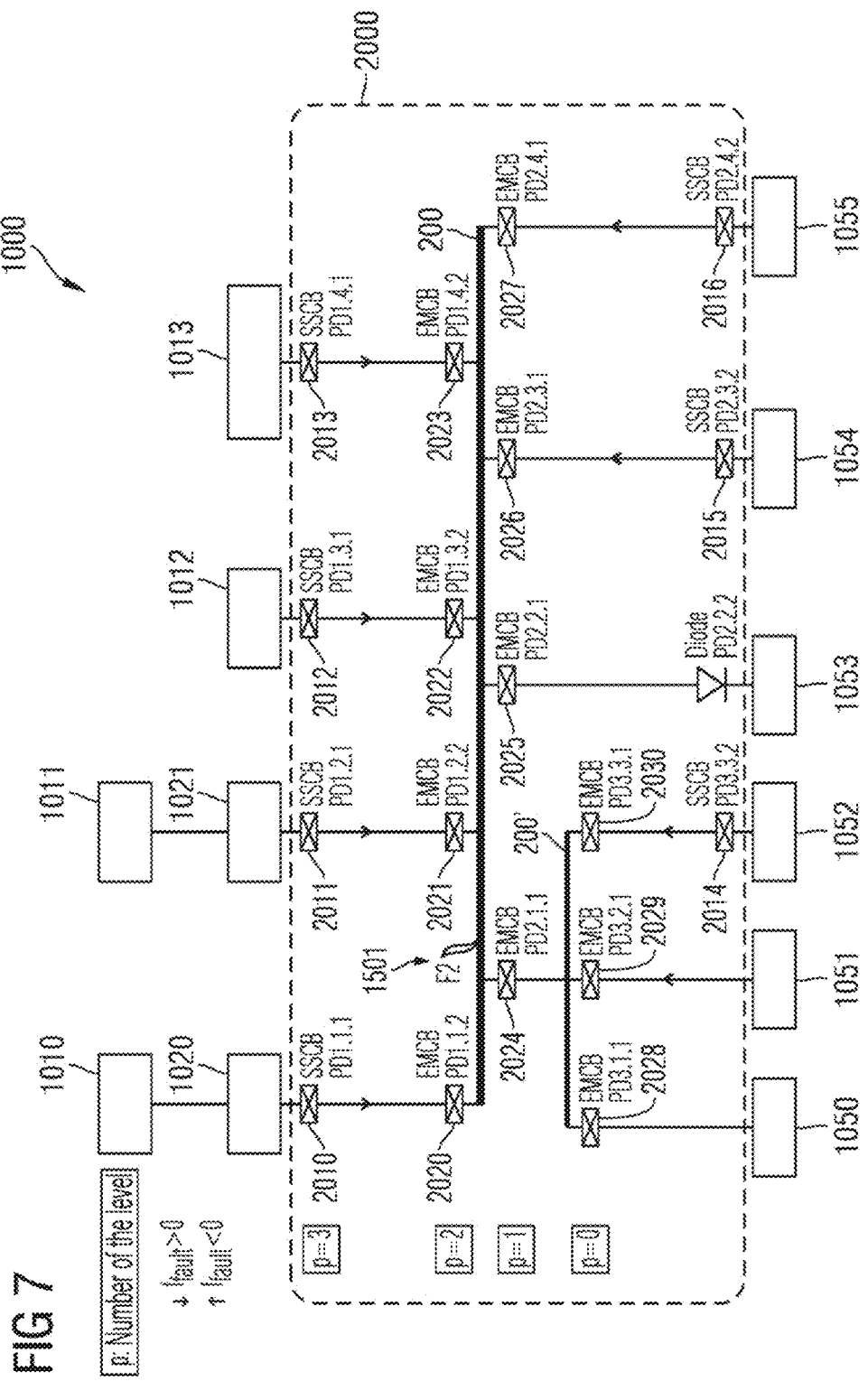
FIG. 7: shows a further electrical network having feed-in devices, loads and a distribution network with protective devices in different levels with a possible fault F2 on the busbar on the feed-in side.

In FIG. 7, a further possible fault 1501 has occurred between the electromechanical switch 2020 and the electromechanical switch 2021. The fault 1501 therefore occurs on the busbar 200.

All automatically, electrically closable apparatuses 2010; 2011; 2012; 2013; 2014; 2015; 2016 in a DC circuit at the feed-in devices 1010; 1011; 1012; 1013 and at the loads 2014; 2015; 2016 open instantaneously as soon as the fault current exceeds the threshold of $I_{inst}$. The electromechanical switches 2020; 2021; 2022; 2023 on the feed-in side (p=2) experience a positive fault current $I_{fault}$ and therefore do not open. The electromechanical switches on the load side experience a negative fault current $I_{fault}$ and therefore do not open. After waiting for the time $t_{EMCB}$, the recharging of the busbar 200 is initiated, which is not possible on account of the second fault 1501 (on the busbar 200 itself). The electromechanical switches 2020; 2021; 2022; 2023 on the feed-in side close within the time $3\times t_{EMCB}+2\times t_{charge}$ and isolate the fault 1501. On account of the fault in the busbar, the electrical network 1000 remains out of operation.

Figure 8:
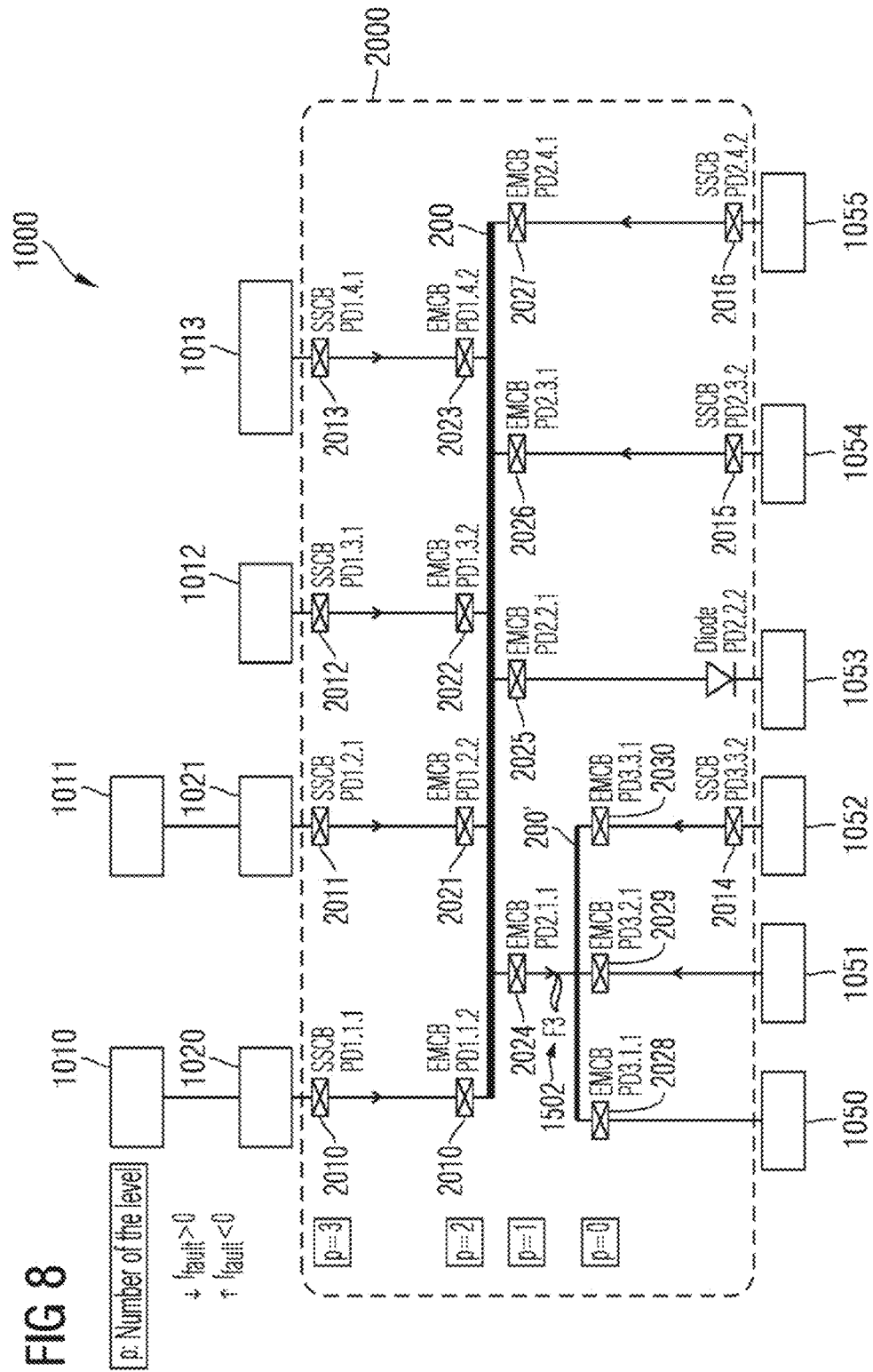
FIG. 8: shows a further electrical network having feed-in devices, loads and a distribution network with protective devices in different levels with a possible fault F3 in a sub-distribution level.

In FIG. 8, a further possible fault 1502 has occurred between the electromechanical switch 2024 and the busbar 200'. The fault 1502 therefore occurs between the busbar 200 and the busbar 200'.

All automatically, electrically closable apparatuses 2010; 2011; 2012; 2013; 2014; 2015; 2016 in a DC circuit at the feed-in devices 1010; 1011; 1012; 1013 and at the loads 2014; 2015; 2016 open instantaneously as soon as the fault current exceeds the threshold of $I_{inst}$. The electromechanical switches 2020; 2021; 2022; 2023 on the feed-in side (p=2) experience a positive fault current $I_{fault}$ and therefore do not open. The same applies to the electromechanical switch 2024. All other electromechanical switches on the load side experience a negative fault current $I_{fault}$ and therefore do not open. After the waiting time $t_{EMCB}$, the automatically electrically closable apparatuses in a DC circuit attempt to restore the voltage on the busbar 200, which is not possible since the fault has not yet been isolated. Since the fault was identified as being on the load side, the electromechanical switch 2024 opens, in total after a period of time of $2\times t_{EMCB}+t_{charge}$, and the fault is isolated. All automatically electrically closable apparatuses on the feed-in side in a DC circuit can now restore the voltage on the busbar 200, and the remaining electrical network is restored within the period of time $2\times(t_{EMCB}+t_{charge})$ and is capable of operation again within this time. The automatically electrically closable apparatus 2014 on the load side in a DC circuit cannot be switched on again, but rather remains disconnected, on account of the fault 1502.

Figure 9:
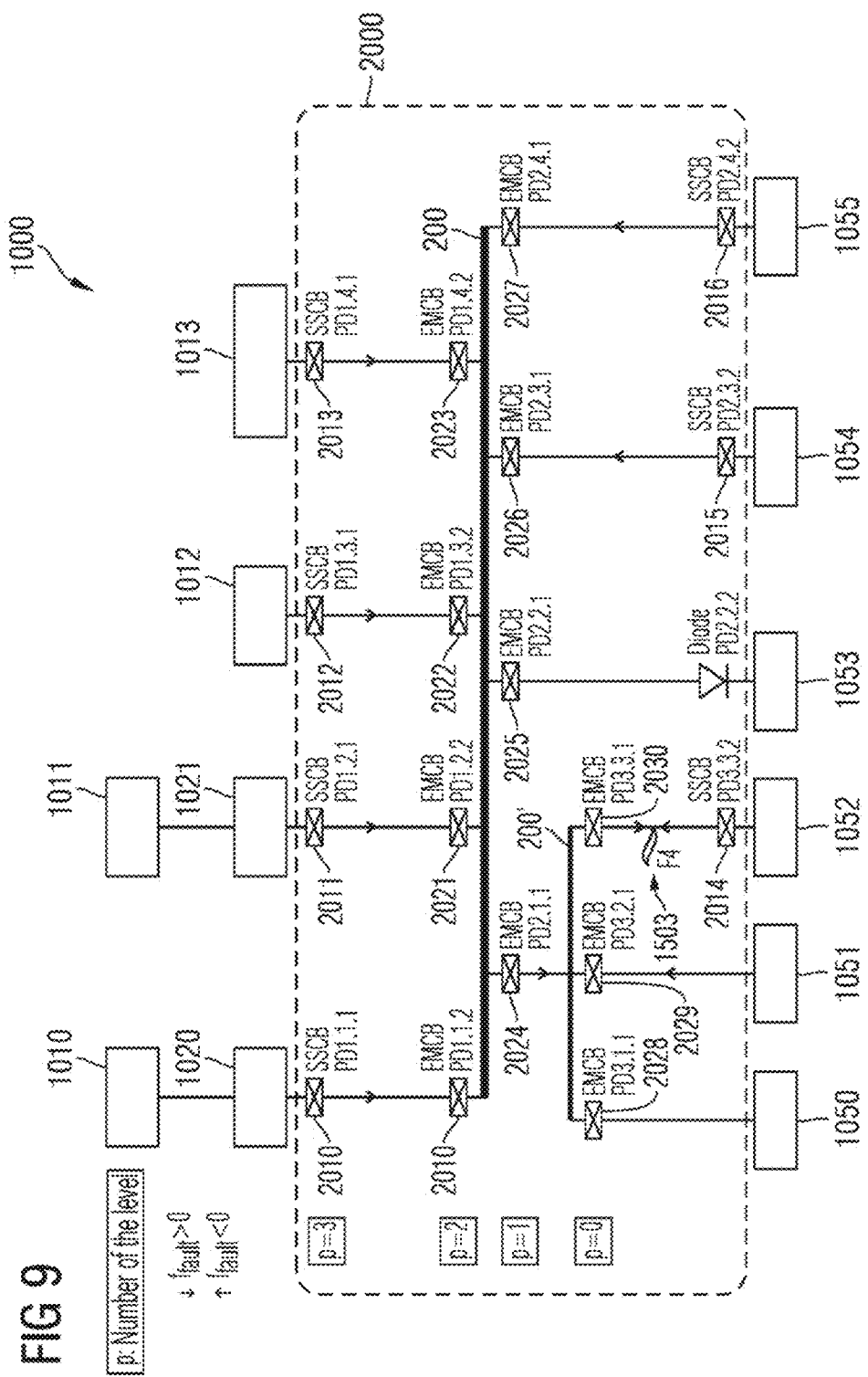
FIG. 9: shows a further electrical network having feed-in devices, loads and a distribution network with protective devices in different levels with a possible fault F4 in the load level.

In FIG. 9, a further possible fault 1503 has occurred between the automatically electrically closable apparatus 2014 in a DC circuit and the electromechanical switch 2030. The fault 1503 therefore occurs between the load 1052 and the busbar 200'.

All automatically electrically closable apparatuses 2010; 2011; 2012; 2013; 2014; 2015; 2016 in a DC circuit at the feed-in devices 1010; 1011; 1012; 1013 and at the loads 2014; 2015; 2016 open instantaneously as soon as the fault current exceeds the threshold of $I_{inst}$. The electromechanical switches 2020; 2021; 2022; 2023 on the feed-in side (p=2) experience a positive fault current $I_{fault}$ and therefore do not open. The same applies to the electromechanical switch 2024. The electromechanical switch 2030 on the load side (p=0) likewise experiences a positive fault current $I_{fault}$ and therefore opens. The fault 1503 is therefore isolated within the period of time $t_{EMCB}$. All automatically, electrically closable apparatuses 2010; 2011; 2012; 2013; 2014; 2015; 2016 in a DC circuit now attempt to restore the voltage on the busbar, with the result that the remaining electrical network is restored within the period of time $t_{EMCB}+t_{charge}+t_{charge2}+t_{tran}$ and is capable of operation again within this time. The automatically, electrically closable apparatus 2014 on the load side in a DC circuit cannot be switched on again, but rather remains disconnected, on account of the fault 1503.

Instead of the time control of the individual protective devices (automatically electrically closable apparatuses in a DC circuit and electromechanical switches), the protective devices can be coordinated by commands. The communication time $t_{comm}$ may be in the range of ms (milliseconds). This makes it possible to reduce the time needed to isolate the fault to $t_{EMCB}+t_{comm}$ in the case of the fault 1502 (FIG. 8) and to reduce the restart time to the period $t_{EMCB}+t_{comm}+t_{charge}+t_{charge2}+t_{tran}$, for example.

Figure 10:
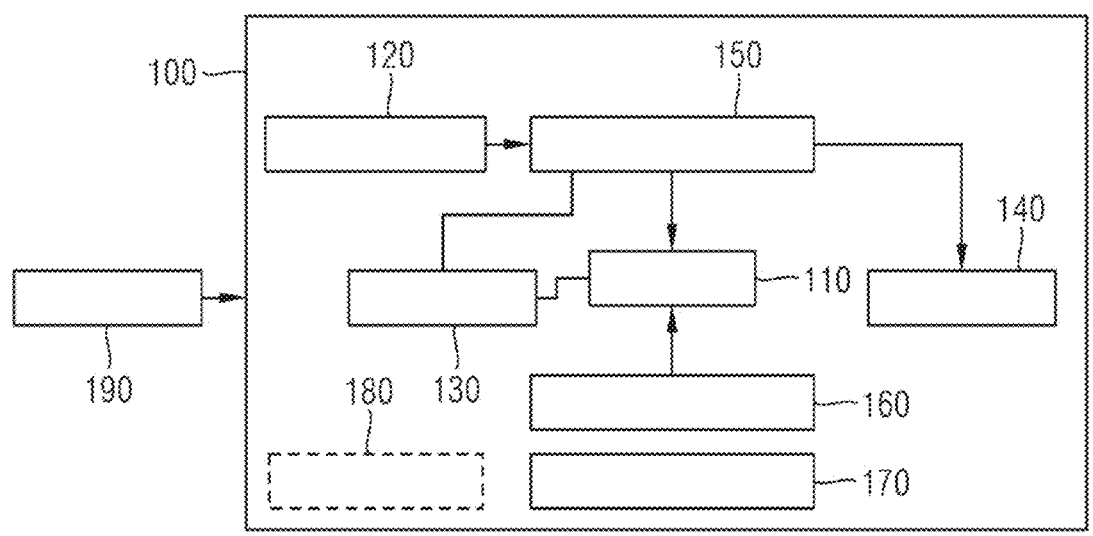
FIG. 10: shows an automatically closable apparatus of a DC circuit.

FIG. 10 illustrates the apparatus 2010; 2011; 2012; 2013; 2014; 2015; 2016 for opening or closing a DC circuit having at least one busbar 200. For this purpose, the apparatus 2010; 2011; 2012; 2013; 2014; 2015; 2016 comprises an electrical switch 110 for opening or closing the DC circuit, a fault current detection device 120, a tripping unit 130 and a pre-charging apparatus 140, wherein, when a fault current is detected by the fault current detection device 120, the electrical switch 110 opens the DC circuit via the tripping unit 130, and wherein the pre-charging apparatus 140 restores the voltage on the busbar 200 before the electrical switch 110 is closed. For automatic closing, a control unit 150 is also provided in the apparatus 2010; 2011; 2012; 2013; 2014; 2015; 2016 and can automatically close the electrical switch 110 after pre-charging.

The electrical switch 110 of the apparatus 2010; 2011; 2012; 2013; 2014; 2015; 2016 may be, for example, a solid-state switch or a semiconductor switch. For example, it may be a semiconductor switch based on silicon (Si), silicon carbide (SiC) or gallium nitride (GaN).

As illustrated in FIG. 10, the apparatus 2010; 2011; 2012; 2013; 2014; 2015; 2016 may also comprise a communication unit 180. This communication unit 180 can receive commands from a superordinate control unit and/or can coordinate apparatuses 2010; 2011; 2012; 2013; 2014; 2015; 2016 arranged in a distribution network 2000.

The apparatus 2010; 2011; 2012; 2013; 2014; 2015; 2016 may also comprise a control unit 160 for suppressing a switch-on transient. For example, in the case of a switch-on transient, the control unit 160 can suppress the high switch-on current in order to avoid false tripping.

The apparatus 2010; 2011; 2012; 2013; 2014; 2015; 2016 may also comprise a measurement unit 170 for measuring current and/or voltage values.

The pre-charging apparatus 140 can restore the voltage on the busbar 200 after a first waiting time. Alternatively, the pre-charging apparatus 140 restores the voltage on the busbar 200 after receiving a command. The command can be passed to the pre-charging apparatus 140 via the communication unit 180.

The control unit 150 for automatically closing the electrical switch 110 can automatically close said switch after a second waiting time. The control unit 150 for automatically closing the electrical switch 110 may likewise close said switch after restoring a voltage on the busbar 200 above a threshold value. For this purpose, the control unit 150 for automatically closing an electrical switch 110 may receive the voltage values on the busbar 200 from the measurement unit 170.

The different components of the apparatus 100, according to at least one example embodiment of the invention, are supplied with electrical energy via the power supply 190. The power supply 190 may be external or internal.

The invention claimed is:

1. A method for coordinating a distribution network of different levels of electromechanical switches and automatically electrically closable apparatuses in a DC circuit, the distribution network being arranged between feed-in devices and loads, and having at least one busbar, wherein each of the apparatuses includes an electrical switch to open or close the DC circuit, a fault current detection device, a tripping unit, and a pre-charging apparatus, wherein if a fault current is detected by the fault current detection device, the electrical switch opens the DC circuit via the tripping unit and the pre-charging apparatus restores a voltage on the at least one busbar before the electrical switch is closed, and wherein each of the apparatuses further includes a control unit to automatically close the electrical switch after successful pre-charging, the method comprising:

in the case of a first apparatus at a feed-in device
setting a counter for the first apparatus to a number of a level in the distribution network;
detecting, using the fault current detection device, whether there is a fault;
if there is a fault, determining whether the fault current exceeds a current threshold;
if the fault current exceeds the current threshold, opening the apparatuses;
determining a direction of the fault current;

in the case of a second apparatus at a load
terminating the method in the case of a positive direction of the fault current; or
in the case of a negative direction of the fault current, checking whether the voltage on the at least one busbar has been restored and, if this is the case, automatically closing the second apparatus; or in the case of a third apparatus at a feed-in device
terminating the method in the case of a negative direction of the fault current; or
in the case of a positive direction of the fault current, decrementing the counter for the third apparatus by one; and
if the counter for the third apparatus is less than or equal to zero, terminating the method; or
if the counter for the third apparatus is greater than zero, waiting for a switch-off time of the electromechanical switches;
charging, using the pre-charging apparatus, to test whether the fault has been eliminated;
checking whether the charging is possible on a side of the loads using the pre-charging apparatus; and either
if the charging is possible, recharging the distribution network, automatically switching on the third apparatus, and suppressing the switching transient, or
if the charging is not possible, decrementing the counter for the third apparatus by one.

2. The method as claimed in claim 1, in an electromechanical switch, the method further comprising:
setting a counter for a load to the number of the level in the distribution network;
detecting a fault using the fault current detection device;
determining that the fault current exceeds a current threshold;
determining a direction of the fault current;
decrementing the counter for the load by one in the case of a positive direction of the fault current;
if the counter for the load is less than or equal to zero, opening the electromechanical switch and terminating the method; or
if the counter for the load is not less than or equal to zero, waiting for the switch-off time of the electromechanical switches and a charging time of the pre-charging apparatus; and
checking whether the charging is possible on the side of the loads; and either
if the charging is possible, waiting for the charging time before automatically closing the apparatuses and jumping to setting the counter for the load, or
if the charging is not possible, jumping to decrementing the counter for the load by one.

3. The method as claimed in claim 1, wherein, when checking whether the charging is possible on the side of the loads, a check is carried out to determine whether a voltage threshold has been reached.

4. The method as claimed in claim 1, wherein, when checking whether the charging is possible on the side of the loads, a check is carried out to determine whether a threshold for a voltage change has been reached.

5. The method as claimed in claim 1, wherein the electrical switch is a semiconductor switch.

6. The method as claimed in claim 1, wherein at least one of the apparatuses further comprises a communication unit.

7. The method as claimed in claim 1, wherein at least one of the apparatuses further comprises a control unit for suppressing a switch-on transient.

8. The method as claimed in claim 7, wherein the control unit for suppressing a switch-on transient generates a high current for a nominal voltage as the switch-on transient.

9. The method as claimed in claim 1, wherein the pre-charging apparatus restores the voltage on the at least one busbar after a first waiting time.

10. The method as claimed in claim 1, wherein the pre-charging apparatus restores the voltage on the at least one busbar after receiving a command.

11. The method as claimed in claim 10, wherein the pre-charging apparatus receives the command via a communication unit.

12. The method as claimed in claim 9, wherein the control unit automatically closes said electrical switch after a second waiting time.

13. The method as claimed in claim 1, wherein the control unit closes said electrical switch after restoring the voltage on the at least one busbar above a threshold value.

14. The method as claimed in claim 2, wherein, when checking whether the charging is possible on the side of the loads, a check is carried out to determine whether a voltage threshold has been reached.

15. The method as claimed in claim 2, wherein, when checking whether the charging is possible on the side of the loads, a check is carried out to determine whether a threshold for a voltage change has been reached.

16. The method as claimed in claim 2, wherein at least one of the apparatuses further comprises a control unit for suppressing a switch-on transient.

17. The method as claimed in claim 16, wherein the control unit for suppressing a switch-on transient generates a high current for a nominal voltage as the switch-on transient.

18. The method as claimed in claim 2, wherein the pre-charging apparatus restores the voltage on the at least one busbar after receiving a command.

19. The method as claimed in claim 1, wherein the control unit closes said electrical switch after a waiting time.

20. The method as claimed in claim 2, wherein the control unit closes said electrical switch after restoring the voltage on the at least one busbar above a threshold value.

* * * * *